(12) United States Patent
Chen et al.

(10) Patent No.: US 10,396,904 B2
(45) Date of Patent: Aug. 27, 2019

(54) ADAPTIVE RLS DECISION FEEDBACK EQUALIZING SYSTEM AND IMPLEMENTATION METHOD THEREOF

(71) Applicant: South China University of Technology, Guangzhou, Guangdong Province (CN)

(72) Inventors: Fangjiong Chen, Guangzhou (CN); Beixiong Zheng, Guangzhou (CN); Fei Ji, Guangzhou (CN); Hua Yu, Guangzhou (CN); Shaoe Lin, Guangzhou (CN); Mengna Lou, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 395 days.

(21) Appl. No.: 15/307,832

(22) PCT Filed: Dec. 1, 2014

(86) PCT No.: PCT/CN2014/092650
§ 371 (c)(1),
(2) Date: Oct. 30, 2016

(87) PCT Pub. No.: WO2015/165261
PCT Pub. Date: Nov. 5, 2015

(65) Prior Publication Data
US 2017/0163353 A1 Jun. 8, 2017

(30) Foreign Application Priority Data

Apr. 30, 2014 (CN) .......................... 2014 1 0180984

(51) Int. Cl.
*H04B 7/005* (2006.01)
*H04B 11/00* (2006.01)
*H04B 13/02* (2006.01)

(52) U.S. Cl.
CPC ............. *H04B 11/00* (2013.01); *H04B 13/02* (2013.01)

(58) Field of Classification Search
None
See application file for complete search history.

(56) References Cited

U.S. PATENT DOCUMENTS

2009/0086810 A1 4/2009 Yasuo
2014/0169441 A1* 6/2014 Hadani ............... H04B 1/1027
375/233

FOREIGN PATENT DOCUMENTS

CN 102792742 11/2012
CN 102916916 2/2013
(Continued)

OTHER PUBLICATIONS

Zheng et al, "Least-Symbol-Error-Rate Adaptive Decision Feedback Equalization for Underwater Channel", WUWNET 13, Nov. 11-13, 2013.

*Primary Examiner* — Hovhannes Baghdasaryan
(74) *Attorney, Agent, or Firm* — JMB Davis Ben-David

(57) ABSTRACT

Disclosed are an adaptive RLS decision feedback equalizing system, characterized by comprising: an error code cross-correlation module, an equalization module, a decision feedback updating unit, a coefficient updating unit and an autocorrelation estimation module. Also disclosed are an implementation method of the adaptive RLS decision feedback equalizing system, comprising the following steps: 1) setting an initial value of $c_0$ for a filtering coefficient; 2) generating a filtering output signal $y_k$; 3) computing an error code cross-correlation result $I_k$; 4) updating the filtering coefficient $c_{k-1}$ to $c_k$; 5) updating an autocorrelation inverse matrix estimation result $P_{k-1}$ to $P_k$ according to a forget constant factor w and an equalizer input signal sequence $r_k$; 6) repeating step 2) to step 5), until the equalizer coefficient converges. The
(Continued)

present invention can achieve appreciable system performance by requiring only a small number of training signals, as well as reliable transmission adapted for the receiving terminal in a complex hydroacoustic environment, and rapid adaptive equalization.

3 Claims, 3 Drawing Sheets

(56) References Cited

FOREIGN PATENT DOCUMENTS

| | | |
|---|---|---|
| CN | 103139804 | 6/2013 |
| CN | 103957176 | 7/2014 |
| WO | 0182474 | 11/2001 |

\* cited by examiner

ADAPTIVE RLS DECISION FEEDBACK EQUALIZING SYSTEM AND IMPLEMENTATION METHOD THEREOF

TECHNICAL FIELD

The present invention relates to the digital wireless communications technology and particularly to an adaptive RLS decision feedback equalizing system and an implementation method therefor. The present invention relates to the channel adaptive equalization technology for an underwater receiving terminal, which is mainly applied to reliable transmission of a receiving terminal in a complex long-channel response underwater acoustic system, can achieve fast adaptive equalization of a time domain or a frequency domain in the underwater acoustic systems and is used for eliminating inter-symbol interference of signals or interference between subcarriers.

BACKGROUND ART

The ocean is a vast and rich world, and marine science exploration causes great concern to many scientists. Underwater acoustic communications and relevant information science and technology have an important role in promoting the development of marine industry. However, an underwater acoustic communication channel has a relatively high time-selectivity and frequency-selectivity, so the underwater acoustic channel is widely considered to be one of the most challenging communication media. Compared to a terrestrial radio channel, a typical shallow underwater acoustic channel shows good time dispersion effect, and inter-symbol interference is very serious. In this case, an effective and fast equalization algorithm is needed to eliminate serious inter-symbol interference of an underwater acoustic channel or the orthogonal frequency-division multiple access technology is used to change a selective fading channel to be a flat fading channel.

Because of the complex and changeable underwater environment, the intensity and phase of an underwater acoustic signal is not stable with random ups and downs of sea surface, as a result, multi-path time delay caused thereby is serious. For terrestrial wireless communications, the length of a channel response is generally considered to be a few symbol periods and is relatively easy to equalize. But for underwater acoustic communications, the length of a channel response is up to hundreds of symbol periods, resulting in serious inter-symbol interference. Meanwhile, the background noise power of an underwater acoustic channel is relatively large, and a signal-to-noise ratio is low. The background noises of an underwater acoustic channel mainly comprise marine environment noise and noise from ships, such as interference noise caused by wind, rain and tides, ship noise, noise from marine life, resulting in the complexity of underwater acoustic channel noises.

A transmission rate in an underwater acoustic communication system is much slower than a transmission rate in terrestrial communications, so that real-time demand is not high. But because seawater medium absorbs interference of an underwater acoustic signal and a seabed channel environment is complex and changeable, a received underwater acoustic signal is seriously distorted. So the problem that needs to be urgently solved in underwater acoustic communications is to minimize a bit error rate as much as possible, so as to ensure reliable communications. For a single-carrier underwater acoustic system, the main problem is an inter-symbol interference (ISI) problem, and symbolic equalization may be performed in a time domain to reduce inter-symbol interference. For a multi-carrier underwater acoustic system, the existing main problem is inter-subcarrier interference caused by inaccurate frequency timing, and in this case, equalization may be performed on subcarriers in a frequency domain to reduce inter-subcarrier interference. Both solutions are available in minimum BER guidelines, this patent is primarily to achieve a balanced symbol for the minimum error rate when the field of underwater acoustic communication system, its implementation can be similarly applied to underwater acoustic communication in the frequency domain.

The South China University of Technology provides an adaptive channel equalizer based on a minimum bit error rate rule and in implementation method therefor (Chinese patent number: CN 102916916 A). Main features of the present patent is that it is distinguished from a traditional adaptive equalization algorithm and is directly derived from a minimum bit error rate rule. A filtering output signal is mapped into a parameter of equalizing the degree of code errors as a basis for next time of filtering parameter modification. The patent is mainly applied to wireless channels with relatively less channel response, has a convergence speed faster than an adaptive method based on a least mean-square rule, a small amount of computation and a simple equalizer structure and is easy to implement, but it is not applicable for an underwater acoustic communication channel with long-channel response.

In addition, a dual-mode adaptive decision feedback equalization module and an implementation method therefor (Chinese patent application number: 20140041987.1) provided by the South China University of Technology proposes a decision feedback implementation method based on a minimum bit error rate. The equalization module uses a decision feedback structure and can be switched to work in two modes. The patent is suitable for an underwater acoustic channel, a time of which is unchanged or is changed very slowly and has a convergence speed faster than that of an equalizer without feedback results, but for an underwater acoustic channel of which the channel changes fast, it is difficult to converge to a desired result.

In a practical underwater acoustic communication system, an adaptive equalization module can be evaluated according to the bit error performance, convergence speed and algorithm complexity of an equalization algorithm, while the reliability of transmission of a communication system is evaluated mainly based on a bit error rate. The patent implementation method mentioned above can meet the requirements of reducing a bit error rate as much as possible, but in actual underwater acoustic communication applications, the number of times of iteration is not expected to be more, i.e. the convergence speed of an equalization module is required to be very fast in order to meet the real-time requirements in underwater acoustic communications. Meanwhile, in a time-varying underwater acoustic channel, when the convergence speed is greater than a channel response change speed, it is possible to achieve a satisfactory convergence result, so only an equalization module with fast convergence can be applied to a changeable underwater acoustic channel.

Most of the existing adaptive equalization algorithms have a lot of shortcomings, cannot take into account of reducing a bit error rate as well as having a higher convergence speed at the same time and is difficult to be applied in a complex underwater environment, so that an adaptive RLS decision feedback equalizing system for realizing a minimum bit error rate in the present invention has the capacity of fatly converging to a very low bit error rate and is thus more suitable for an underwater acoustic communication system.

Content of the Invention

The primary purpose of the present invention is to overcome the disadvantages and deficiencies in the prior art and to provide an adaptive RLS decision feedback equalizing system. The adaptive RLS decision feedback equalizing system can achieve a result of minimum bit error rate and effectively eliminate inter-symbol interference, can converge to an optimal value at the fastest speed and occupies less bandwidth. The adaptive RLS decision feedback equalizing system can also achieve a minimum bit error rate result, effectively eliminate inter-symbol interference and has a fast adaptive convergence speed.

Another purpose of the present invention is to overcome the disadvantages and deficiencies in the prior art and to provide an implementation method for an adaptive RLS decision feedback equalizing system. The implementation method can achieve appreciable system performance by requiring only a small number of training signals, has high flexibility and can overcome the deficiency that most of relevant adaptive equalization algorithms are difficult to be directly applied to a complex underwater environment.

The primary purpose of the present invention is implemented by the following technical solution: an adaptive RLS decision feedback equalizing system, comprising: an error code cross-correlation module, an equalization module, a decision feedback unit, a coefficient updating unit and an autocorrelation estimation module, wherein a processing result of the error code cross-correlation module is mapping a previous filtering output signal $y_k$ into a multiplication result of an error code indication signal $e_k$ and an equalizer input signal sequence $r_k$ as an indication vector for equalizer parameter adjustment, and a correlation is as follows:

$$I_k = (\tan h(\beta y_k) - s_{k-D}) \cdot r_k = e_k r_k,$$

where subscript k represents a current time, subscript D is a time delay of an equalizer output signal with respect to a sending terminal signal; $s_{k-D}$ is a desired signal in sending terminal pilot signals; $\beta$ is a constant factor for controlling a mapping relationship; $e_k = \tan h(\beta y_k) - s_{k-D}$ is an error code indicator; $r_k$ represents an equalizer input signal sequence and is composed of a receiving symbol sequence and a decision feedback symbol sequence together;

the equalization module contains a filter and a coefficient updating unit, the filter performs filtering equalization on a current input signal sequence $r_k$ to obtain an output signal $y_k$:

$$y_k = f_{k-1}{}^T \gamma_k + b_{k-1}{}^T \hat{s}_{k-D} = c_{k-1}{}^T r_k,$$

where $c_{k-1}$ is a filtering coefficient not updated and contains two portions, a feedforward filter $f_{k-1}$ and a feedback filter $b_{k-1}$, superscript T represents transposition of a matrix; and the input signal sequence $r_k$ is composed of the receiving symbol sequence $\gamma_k$ and the decision feedback symbol sequence $\hat{s}_{k-D}$;

the decision feedback unit directly performs decision according to an equalized output signal, a decision result will be used as a feedback input signal of the equalizer, and this is implemented as follows:

$$\hat{s}_{k-D} = \underset{s_{k-D}}{\arg\min} \|y_k - s_{k-D}\|,$$

where $\| \ \|$ represents module value computation, a decision process is represented by obtaining a minimum module value result; $\hat{s}_{k-D}$ is an output decision result, is estimation of a desired signal $s_{k-D}$ in sending terminal pilot signals and is an input signal that will be used in an equalizer feedback portion;

the coefficient updating unit updates a current filtering coefficient $c_{k-1}$ to $c_k$ according to the equalizer input signal sequence $r_k$ and the processing result of the error code cross-correlation module $I_k$, and this is implemented as follows:

$$c_k = c_{k-1} - \mu \frac{P_{k-1} I_k}{(w + r_k^T P_{k-1} r_k)},$$

where $\mu$ is a step size adjustment constant; w is a forget constant factor; the filtering coefficient $c_k$ and the equalizer input signal sequence $r_k$ are column vectors; and $P_{k-1}$ is an autocorrelation inverse matrix not updated;

the autocorrelation inverse matrix estimation module contains a memory coefficient unit and an autocorrelation inverse matrix register and uses a currently received symbol sequence $r_k$ result to update autocorrelation inverse matrix estimation, and updating the autocorrelation inverse matrix estimation is implemented as follows:

$$P_k = \frac{1}{w}\left[P_{k-1} - \frac{P_{k-1} r_k r_k^T P_{k-1}}{w + r_k^T P_{k-1} r_k}\right],$$

where w is a forget constant factor; a receiving signal $r_k$ is a column vector; and $P_{k-1}$ is an autocorrelation inverse matrix not updated.

The other purpose purpose of the present invention is implemented by the following technical solution: an implementation method for an adaptive RLS decision feedback equalizing system, comprising the following steps:

1) setting an initial value of $c_u$ for a filtering coefficient, where may be any non-zero value; setting an initial value of $P_0$ for an autocorrelation inverse matrix, wherein an autocorrelation inverse matrix that is close to an actual input sequence is selected, if it is hard to estimate, it is assumed that $P_0 = \sigma E$, where E is a unit matrix, $\sigma$ can be selected to be a relatively large constant, such as greater than or equal to 10; and setting values of control parameters D, $\beta$, $\mu$, w and $\varepsilon$;

2) using a currently not updated filtering coefficient $c_{k-1}$ to filter the input signal sequence $r_k$ to generate a filtering output signal $y_k$;

3) computing an error code cross-correlation result $I_k$ based on the filtering output signal $y_k$, a desired signal $s_{k-D}$ in a pilot sequence and the input signal sequence $r_k$;

4) updating the filtering coefficient $c_{k-1}$ to $c_k$ according to a step size u, a forget constant factor w, the error code cross-correlation result $I_k$, an equalizer input signal sequence $r_k$ and an autocorrelation inverse matrix estimation result $P_{k-1}$ not updated;

5) updating an autocorrelation inverse matrix estimation result $P_{k-1}$ to $P_k$ according to a forget constant factor w and equalizer input signal sequence $r_k$;

6) repeating step 2) to step 5), until the equalizer coefficient converges, i.e. $\|c_{k+1} - c_k\| \leq \varepsilon$.

Compared with the prior art, the present invention has the following advantages and effects:

1) an equalizer filtering coefficient is directly adjusted based on the principle of maximum bit error rate, thereby achieving a channel equalization result of a maximum bit error rate;

2) a feedback portion is introduced into equalizer filtering, and feedback information is used, thereby achieving a better convergence effect;

3) introducing estimation of an autocorrelation inverse matrix is introduced into each time of adjustment of a filtering coefficient can apparently speed up a convergence speed of an adaptive algorithm.

DETAILED DESCRIPTION OF THE EMBODIMENTS

The present invention is described in further detail hereunder with reference to the attached drawings, but the embodiments of the present invention are not limited thereto.

Embodiments

Figure 3:
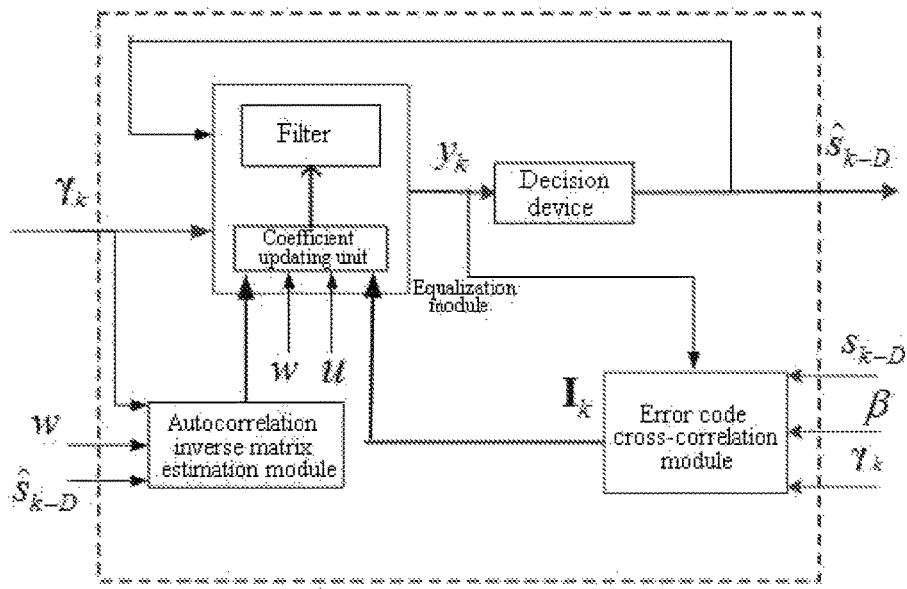
FIG. 3 is a schematic diagram of an adaptive RLS decision feedback equalizing system for achieving a minimum bit error rate in the present invention.

As shown in FIG. 3, an adaptive decision feedback recursive equalizer based on a minimum bit error rule comprises: an error code cross-correlation module, an equalization module, a decision feedback unit, a coefficient updating unit and an autocorrelation estimation module, which are all realized by DSP.

The error code cross-correlation module is configured to map a current time of filter output signal into a parameter of evaluating the degree of code errors as the basis of one time of filtering parameter modification, and the specific mapping relationship is as follows:

$$I_k = (\tan h(\beta y_k) - s_{k-D}) \cdot r_k = e_k r_k, \quad (1)$$

where the meaning of each label is as follows:
k: a timeslot subscript, representing a current time;
$y_k$: a current output signal of a filter;
$s_k$: a desired signal in pilot signals of a sending terminal;
D: a time delay of a filter output signal with respect to a sending terminal pilot signal;
$\beta$: a sufficiently large constant used for controlling a mapping relationship.
$e_k = \tan h(\beta y_k) - s_{k-D}$ is an error code indication symbol;
$r_k$ represents a receiving symbol sequence;
The equalization module is configured to filter a receiving signal sequence $r_k$ so as to obtain a filter output signal $y_k$ and update a filtering coefficient according to an input signal sequence $r_k$; an autocorrelation inverse matrix not updated $P_{k-1}$ and an error code cross-correlation module processing result $I_k$. The specific calculation mode is as follows:

$$y_k = f_{k-1}^T \gamma_k + b_{k-1}^T \hat{s}_{k-D} = c_{k-1}^T r_k, \quad (2)$$

$$c_k = c_{k-1} - \mu \frac{P_{k-1} I_k}{(w + r_k^T P_{k-1} r_k)}, \quad (3)$$

where the meaning of each label is as follows:
$f_{k-1}$: a column vector composed of feedforward equalizer filtering coefficients not updated;
$b_{k-1}$: a column vector composed of feedback equalizer filtering coefficients not updated;
$\gamma_k$: a column vector composed of receiving signals, and elements thereof are arranged in a time-descending order from a current time;
$\hat{s}_{k-D}$: a column vector composed of decision feedback signals, and elements thereof are arranged in a time-descending order;
$c_{k-1}$: a column vector composed together of feedforward and feedback equalizer filtering coefficients not updated;
$r_k$: a column vector composed of an input signal sequence, a sequence composed together of a receiving signal and a decision feedback signal, and the vector length is equal to $c_{k-1}$;
$I_k$: a column vector composed of error code cross-correlation module processing results, an element thereof is multiplication of an error code and the receiving signal sequence, and the vector length is equal to $r_k$;
$P_{k-1}$: an autocorrelation inverse matrix of a receiving sequence not updated is updated according to a receiving signal sequence $r_k$, and a dimension of the matrix is equal to a vector length $r_k$;
$\mu$: a value range is $$\left(0, \frac{1}{\beta \tanh'(\beta)}\right)$$

and is used for controlling an adjustment step size of a filtering coefficient, and for convenient consideration, the value may generally be 1;
w: a forget constant factor, and a value thereof is generally close to 1.

The autocorrelation inverse matrix estimation module contains a memory coefficient unit and an autocorrelation inverse matrix register and uses a current input signal sequence $r_k$ result to update an autocorrelation inverse matrix estimation result, and updating the autocorrelation inverse matrix estimation is implemented as follows:

$$P_k = \frac{1}{w}\left[P_{k-1} - \frac{P_{k-1} r_k r_k^T P_{k-1}}{w + r_k^T P_{k-1} r_k}\right], \quad (4)$$

where the meaning of each label is as follows:
w: a forget constant factor;
$r_k$: a column vector composed of an input signal sequence, a sequence composed together of a receiving signal and a decision feedback signal;
$P_{k-1}$: an autocorrelation inverse matrix of a receiving sequence not updated is updated according to a received receiving sequence, and a dimension of the matrix is equal to a vector length $r_k$;

The adaptive RLS decision feedback equalizer for realizing a minimum bit rate rule completes equalization by an error code cross-correlation module, an equalization module and an autocorrelation inverse matrix estimation module working circularly in order, and the specific steps are as follows:

step 1, setting an initial value of $c_0$ for a filtering coefficient, where may be any non-zero value; setting an initial value of $P_0$ for an autocorrelation inverse matrix, wherein an autocorrelation inverse matrix that is close to an actual input signal sequence is selected, if it is hard to estimate, it is assumed that $P_0 = \sigma E$, where E is a unit matrix, $\sigma$ can be selected to be a relatively large constant, such as greater than or equal to 10; and setting values of control parameters D, $\beta$, $\mu$, w and $\varepsilon$;

step 2, using a currently not updated filtering coefficient $c_{k-1}$ to filter the input signal sequence $r_k$ to generate a filtering output signal $y_k$;

step 3, performing decision with the filtering output signal $y_k$ and deciding to output an estimation result $\hat{s}_{k-D}$ of a desired signal;

step 4, computing an error code cross-correlation result $I_k$ based on the filtering output signal $y_k$, a desired signal $s_{k-D}$ in a pilot sequence and a receiving sequence $r_k$;

step 5, updating the filtering coefficient $c_{k-1}$ to $c_k$ according to a step size u, a forget constant factor w, the error code cross-correlation result $I_k$, an equalizer input signal sequence $r_k$ and an autocorrelation inverse matrix estimation result $P_{k-1}$ not updated;

step 6, updating an autocorrelation inverse matrix estimation result w to $r_k$ according to a forget constant factor $P_{k-1}$ and an equalizer input signal sequence $P_k$;

step 7, repeating step 2) to step 6), until the equalizer coefficient converges, i.e. a convergence condition $\|c_{k+1} - c_k\| \leq \varepsilon$ is met.

Figure 1:
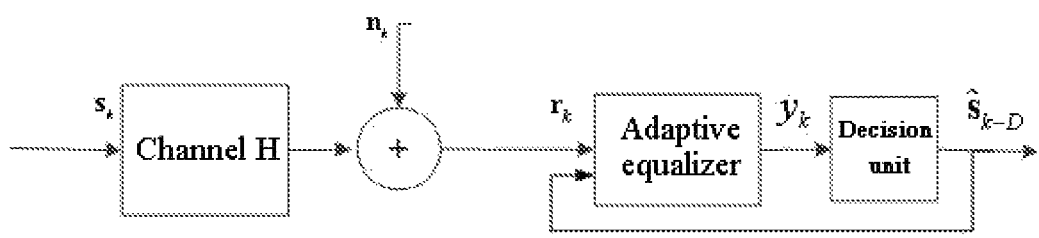
FIG. 1 is a structural schematic diagram of a general adaptive decision feedback equalizing system.

As shown in FIG. 1, a sending signal $s_k$ is a binary pilot signal input by a channel, $s_{k-D}$ is a desired signal in the pilot signals, $h^k$ is channel impulse response, a remember length is L, and $n_k$ is a white Gaussian noise with a power spectrum density being $\sigma^2$.

Figure 2:
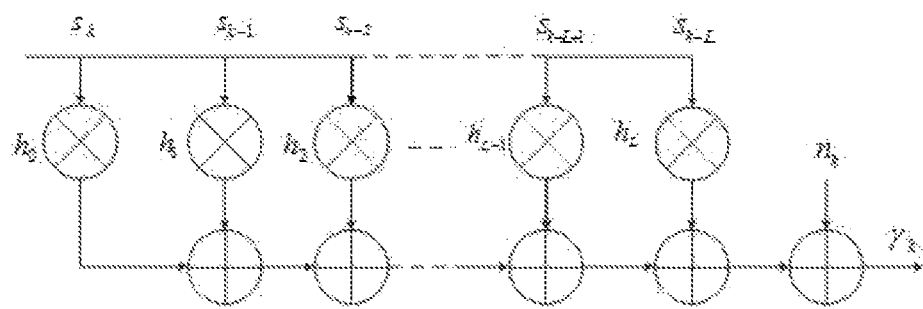
FIG. 2 is a schematic diagram for a channel used for a sending sequence.

A convolution function of a channel to a signal is as shown in FIG. 2, a channel output signal may be obtained as:

$$r_k = \sum_{i=0}^{L} h_i s_{k-i} + n_k,$$

Figure 4:
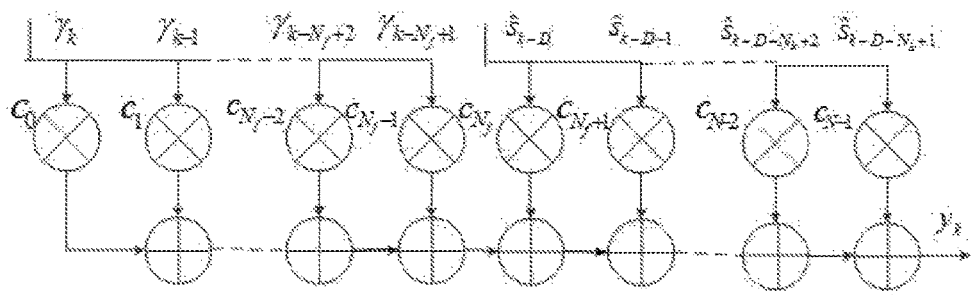
FIG. 4 is a schematic diagram of a filter structure in an equalization module.

An input signal of the equalization module may be represented as:

$$r_k = [r_k, r_{k-1}, \ldots, r_{k-N_f-1}]^T = HS_k + n_k,$$

where $r_k$ is a receiving signal, $n_k$ is an added noise, H is a Toeplitz matrix, $s_k = [s_k \ldots s_{k-M-N+1}]^T$, a forward equalization module filtering coefficient is $f = [f_0 \ldots f_{N_f-1}]^T$, a backward equalization module filtering coefficient is $b = [b_0 \ldots b_{N_f-1}]^T$, and an equalization module decision feedback signal may be represented as:

$$\hat{s}_k = [\hat{s}_{k-D-1}, \hat{s}_{k-D-2}, \ldots, \hat{s}_{k-D-N_b}]^T,$$

the module decision adds the receiving signal and the decision feedback signal after performing weighting diversity process respectively, as shown in FIG. 4, an output signal is:

$$y_k = f_{k-1}^T r_k + b_{k-1}^T \hat{s}_{k-D} = c_{k-1}^T r_{k-1},$$

for the binary signal, a decision feedback is performed on the equalization result:

$$\hat{s}_{k-D} = \text{sgn}(y_k),$$

based on the minimum mean square error rule, a target function is:

$$\min J(c) = |e_k|^2 = |s_{k-D} - c_k^T \gamma_k|^2,$$

the target function is derived:

$$\nabla J(c) = \frac{\partial}{\partial C} \{s_{k-D}^2 + c_k^T r_k r_k^T c_k - s_{k-D} c_k^T \gamma_k - r_k^T c_k x_{k-D}\}$$
$$= 2r_k(r_k^T c_k - x_{k-D})$$
$$= 2e_k r_k,$$

it is obtained according to a gradient algorithm:

$$c_{k+1} = c_k - u e_k r_k,$$

This is the famous adaptive decision feedback algorithm based on least mean-squares, which is called LMS-DFE algorithm for short. Such method is not directly based on a minimum bit error rate rule and cannot ensure the best bit error rate performance. Furthermore, the algorithm is based on gradient descent, rather than directly points to an optimal convergence result, and a convergence speed is relatively slow and is hard to be used in an underwater communication environment.

The present invention provides a new adaptive decision feedback recursive equalizer algorithm based on a minimum bit error rate rule, and the derivation process is as follows:

a bit error rate of the above-mentioned equalizing method may be represented as:

$$\text{BER} = 1 - Pr[\text{sgn}(\beta c_k^T r_j)] = s_{j-D}, \quad (5)$$

The following problem of constrained optimization $\min \|c_k - c_{k-1}\|^2$ is taken into consideration, a constraint condition is $\text{sgn}(\beta c_k^T r_j) = s_{j-D}$ where $j = D, D+1, \ldots, k$ represents performing constraint on a plurality of symbol results at the same time. A lagrange multiplier method is used for solving, and a target function is defined as:

$$J(c_k) = \|c_k - c_{k-1}\|^2 + \lambda \sum_{i=D}^{k} w^{k-i}(\text{sgn}(\beta c_k^T r_i) - s_{i-D}), \quad (6)$$

where w represents a forget constant factor, $w^{k-i}$ represents that there is a degeneration process for a symbol error result, and $\lambda$ is a lagrange multiplier. In order to facilitating derivation, $\tanh(\beta x)$ is used here to replace $\text{sgn}(x)$, $\beta$ is a sufficiently large constant, and the derivation is as follows:

$$\frac{\partial J(c_k)}{\partial c_k} = 2(c_k - c_{k-1}) + \lambda \beta \sum_{i=D}^{k} w^{k-i} \tanh'(\beta c_k^T r_i) \cdot r_i, \quad (7)$$

it is assumed that $$\frac{\partial J(c)}{\partial c_{k+1}} = 0,$$

i.e. a partial derivative result is zero, and it can be obtained that:

$$c_k = c_{k-1} - \frac{1}{2}\lambda\beta\sum_{i=D}^{k} w^{k-i}\tanh'(\beta c_k^T r_i) \cdot r_i, \tag{8}$$

transposition is performed to obtain:

$$c_k^T = c_{k-1}^T - \frac{1}{2}\lambda\beta\sum_{i=D}^{k} w^{k-i}\tanh'(\beta c_k^T r_i) \cdot r_i^T, \tag{9}$$

this is substituted into the constraint condition, and weighted stack $$\sum_{i=D}^{k} w^{k-i}(\operatorname{sgn}(\beta c_k^T r_i) - s_{i-D})$$

is performed to obtain:

$$\sum_{j=D}^{k} w^{k-j}\left(\tanh\left(\beta\left(c_{k-1} - \frac{1}{2}\lambda\beta\sum_{i=D}^{k} w^{k-i}\tanh'(\beta c_k^T r_i) \cdot r_i\right)^T r_j\right) - s_{j-D}\right) \cdot r_j^T = 0, \tag{10}$$

The above equation may further be changed as:

$$\sum_{j=D}^{k} w^{k-j}\tanh\left(\beta c_{k-1}^T r_j - \frac{1}{2}\lambda\beta^2 \sum_{i=D}^{k} w^{k-i}\tanh'(\beta c_k^T r_i) \cdot r_i^T r_j\right) \cdot r_j^T = \sum_{j=D}^{k} w^{k-j} s_{j-D} \cdot r_j^T, \tag{11}$$

tan h(x) in the above equation is approximated as a Taylors expansion tan h(x+Δ)≈tan h(x)+tan h'(x)Δ, i.e.

$$\sum_{j=D}^{k} w^{k-j}\left\{\tanh(\beta c_{k-1}^T r_j) \cdot r_j^T - \frac{1}{2}\lambda\beta^2 \tanh'(\beta c_{k-1}^T r_j) \cdot \sum_{i=D}^{k} w^{k-i}\tanh'(\beta c_k^T r_i) \cdot r_i^T r_j r_j^T\right\} = \sum_{j=D}^{k} w^{k-j} s_{j-D} \cdot r_j^T, \tag{12}$$

It is assumed that channel distortion has been compensated by an equalizer at interval k, the left of the equation β tan h'(βc$_k^T$r$_j$)≈β tan h'(β) may be obtained in theory, and it may be considered that a value of the item is a constant at this time. Thus, it may be obtained:

$$-\frac{1}{2}\lambda\beta\sum_{i=D}^{k} w^{k-i}\tanh'(\beta c_k^T r_i) \cdot r_i^T \sum_{j=D}^{k} w^{k-j}(r_j r_j^T) = -\sum_{j=D}^{k} w^{k-j}\frac{(\tanh(\beta c_{k-1}^T r_j) - s_{j-D}) \cdot r_j^T}{\beta\tanh'(\beta)}, \tag{13}$$

$$\sum_{j=D}^{k} w^{k-j} c_{k-1}^T (r_j r_j^T)$$

are added to both sides of the equation, so as to obtain:

$$\left(c_{k-1}^T - \frac{1}{2}\lambda\beta\sum_{i=D}^{k} w^{k-i}\tanh'(\beta c_k^T r_i) \cdot r_i^T\right)\sum_{j=D}^{k} w^{k-j}(r_j r_j^T) = \sum_{j=D}^{k} w^{k-j}\left(-\frac{(\tanh(\beta c_{k-1}^T r_j) - s_{j-D}) \cdot r_j^T}{\beta\tanh'(\beta)} + c_{k-1}^T(r_j r_j^T)\right), \tag{14}$$

$$c_k^T = c_{k-1}^T - \frac{1}{2}\lambda\beta\sum_{i=D}^{k} w^{k-i}\tanh'(\beta c_k^T r_i) \cdot r_i^T$$

of (9) is substituted into the above-mentioned equation, so as to obtain:

$$c_k^T \sum_{j=D}^{k} w^{k-j}(r_j r_j^T) = \sum_{j=D}^{k} w^{k-j}\left(-\frac{\tanh(\beta c_{k-1}^T r_j) - s_{j-D}) \cdot r_j^T}{\beta\tanh'(\beta)} + c_{k-1}^T(r_j r_j^T)\right), \tag{15}$$

(15) is translated, so as to obtain:

$$c_k^T \sum_{j=D}^{k} w^{k-j}(r_j r_j^T) = \sum_{j=D}^{k} w^{k-j}\left(-\frac{(\tanh(\beta c_{k-1}^T r_j) - s_{j-D}) \cdot r_j^T}{\beta\tanh'(\beta)} + c_{k-1}^T(r_j r_j^T)\right) \tag{16}$$

$$\approx w\sum_{j=D}^{k-1} w^{k-1-j}\left(-\frac{(\tanh(\beta c_{k-2}^T r_j) - s_{j-D}) \cdot r_j^T}{\beta\tanh'(\beta)} + c_{k-2}^T(r_j r_j^T)\right) - \frac{(\tanh(\beta c_{k-1}^T r_k) - s_{k-D}) \cdot r_k^T}{\beta\tanh'(\beta)} + c_{k-1}^T(r_k r_k^T)$$

-continued $$= wc_{k-1}^T \sum_{j=D}^{k-1} w^{k-1-j}(r_j r_j^T) - \frac{(\tanh(\beta c_{k-1}^T r_k) - s_{k-D}) \cdot r_k^T}{\beta \tanh'(\beta)} +$$

$$c_{k-1}^T (r_k r_k^T)$$

$$= c_{k-1}^T \left( \sum_{j=D}^{k} w^{k-j}(r_j r_j^T) - r_k r_k^T \right) - \frac{(\tanh(\beta c_{k-1}^T r_k) - s_{k-D}) \cdot r_k^T}{\beta \tanh'(\beta)} +$$

$$c_{k-1}^T (r_k r_k^T)$$

$$= c_{k-1}^T \sum_{j=D}^{k} w^{k-j}(r_j r_j^T) - \frac{(\tanh(\beta c_{k-1}^T r_k) - s_{k-D}) \cdot r_k^T}{\beta \tanh'(\beta)},$$

a column vector $I_k = (\tan h((\beta c_{k-1}^T r_k) - s_{k-D}) \cdot r_k$ is defined, an estimation result of an autocorrelation matrix is defined as $$R_k = \sum_{j=D}^{k} w^{k-j}(r_j r_j^T),$$

a step size is $$\mu = \frac{1}{\beta \tanh'(\beta)},$$

then equation (16) can be expressed as:

$$c_k = c_{k-1} - \mu I_k R_k^{-1} \quad (17)$$

It is complex to directly solve and compute a result of an autocorrelation inverse matrix $R_k^{-1}$, and iteration computing may be performed based on the following formula:

$$R_k = \sum_{j=D}^{k} w^{k-j}(r_j r_j^T) = w \cdot \sum_{j=D}^{k-1} w^{k-j-1}(r_j r_j^T) + r_k r_k^T = w \cdot R_{k-1} + r_k r_k^T, \quad (18)$$

The above-mentioned equation may be obtained by means of linear transformation of a matrix:

$$R_k^{-1} = \frac{1}{w}\left[ R_{k-1}^{-1} - \frac{R_{k-1}^{-1} r_k r_k^T R_{k-1}^{-1}}{w + r_k^T R_{k-1}^{-1} r_k} \right] = \frac{1}{w}\left[ \frac{w R_{k-1}^{-1}}{w + r_k^T R_{k-1}^{-1} r_k} \right], \quad (19)$$

it is assumed that $P_k = R_k^{-1}$, an adaptive decision feedback recursive equalizer based on a minimum bit error rate may be obtained:

$$c_k = c_{k-1} - \mu \frac{I_k P_{k-1}}{(w + r_k^T P_{k-1} r_k)}, \quad (20)$$

The algorithm is named as a minimum bit error rate (minimum-BER) adaptive RLS decision feedback equalization (RLS-DFE), and the specific embodiments are as shown in FIG. 3.

The present invention relates to adaptive RLS decision feedback equalization for realizing a minimum bit error rate, and is apparently better than a least-mean square algorithm in terms of the bit error rate performance. In the above-mentioned embodiment, a decision feedback module is introduced based on a minimum bit error rate, so that the convergence performance of an equalizer is greatly improved. Different from a gradient estimation algorithm, an estimation module of an autocorrelation inverse matrix is added to the input of an equalizer, autocorrelation information about signals is used to speed up a convergence speed.

Figure 5:
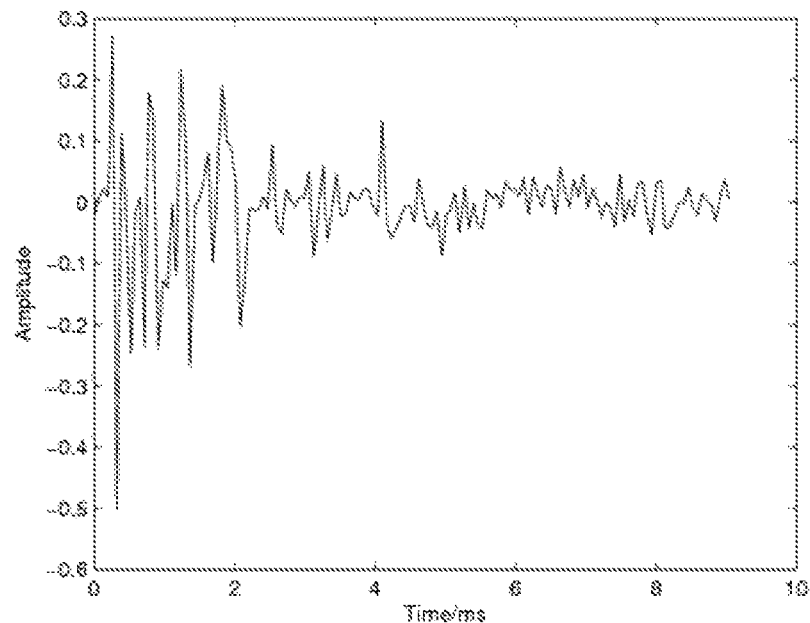
FIG. 5 is a schematic diagram of impulse response of an underwater acoustic channel tested in experiment.
Figure 6:
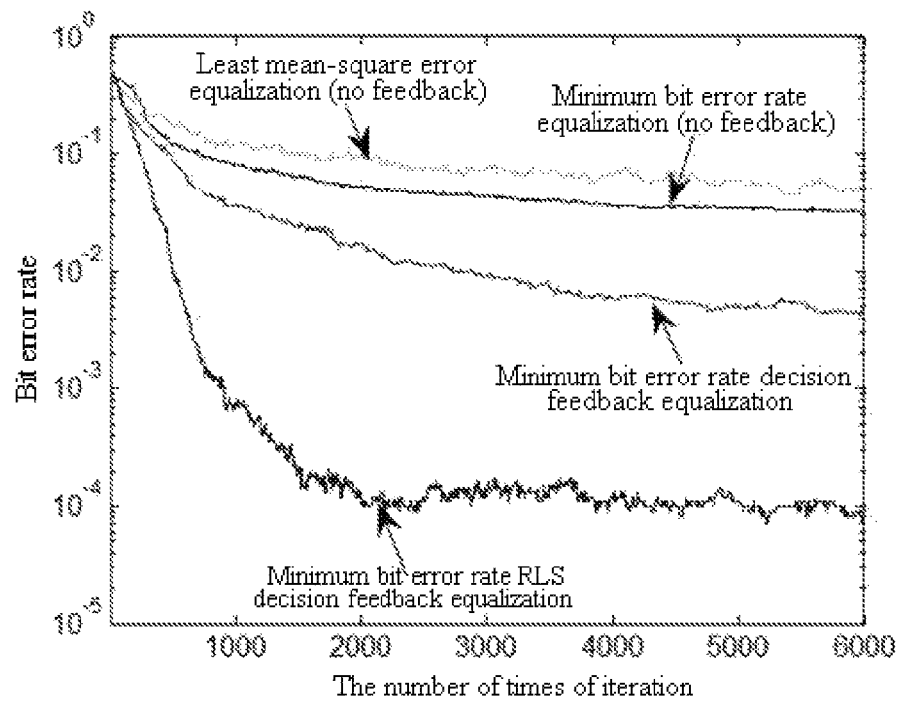
FIG. 6 is a comparison result of convergence performance of various adaptive equalization in an experiment underwater acoustic channel and the adaptive decision feedback recursive equalization based on a minimum bit error rate rule in the present invention.

As shown in FIG. 5 and FIG. 6, a simulation platform of an underwater acoustic channel is established by means of matlab, a modulation mode of BPSK is selected, experiment is conducted in a practically tested underwater acoustic channel, and a signal-to-noise ratio is SNR=16 dB. The other three algorithms are selected, convergence results thereof are compared with that of minimum bit error rate adaptive RLS decision feedback equalization (RLS-DFE), where w takes 0.99, β takes 1, an adaptive step size u is 1, and in an initial autocorrelation inverse matrix $P_0 = \sigma E$, $\sigma = 50$. It can be seen from the figures that the RLS-DFE algorithm is observably better than the other three algorithms not only in terms of a bit error performance, but also in a convergence speed.

The above-mentioned embodiments are preferred embodiments of the present invention, and the embodiments of the present invention are not limited to the above-mentioned embodiments. Any other change, modification, replacement, combination and simplification that are made without departing from the spirit essence and principle of the present invention are all equivalent substitution methods and are contained within the scope of protection of the present invention.

The invention claimed is:

1. An adaptive RLS decision feedback equalizing system, characterized by comprising: an error code cross-correlation module, an equalization module, a decision feedback unit, a coefficient updating unit and an autocorrelation estimation module, wherein a processing result of the error code cross-correlation module is mapping a previous filtering output signal $y_k$ into a multiplication result of an error code indication signal $e_k$ and an equalizer input signal sequence $r_k$ as an indication vector for equalizer parameter adjustment, and a correlation is as follows:

$$I_k = (\tan h(\beta y_k) - s_{k-D}) \cdot r_k = e_k r_k,$$

where subscript k represents a current time, subscript D is a time delay of an equalizer output signal with respect to a sending terminal signal; $s_{k-D}$ is a desired signal in sending terminal pilot signals; β is a constant factor for controlling a mapping relationship; $e_k = \tan h(\beta y_k) - s_{k-D}$ is an error code indicator; $r_k$ represents an equalizer input signal sequence and is composed of a receiving symbol sequence and a decision feedback symbol sequence together;

the equalization module contains a filter and a coefficient updating unit, the filter performs filtering equalization on a current input signal sequence $r_k$ to obtain an output signal $y_k$:

$$y_k = f_{k-1}^T \gamma_k + b_{k-1}^T \hat{s}_{k-D} = c_{k-1}^T r_k,$$

where $c_{k-1}$ is a filtering coefficient not updated and contains two portions, a feedforward filter $f_{k-1}$ and a feedback filter $b_{k-1}$, superscript T represents transposition of a matrix; and the input signal sequence $r_k$ is composed of the receiving symbol sequence $\gamma_k$ and the decision feedback symbol sequence $\hat{s}_{k-D}$;

the decision feedback unit directly performs decision according to an equalized output signal $y_k$, a decision result will be used as a feedback input signal of the equalizer, and this is implemented as follows:

$$\hat{s}_{k-D} = \underset{s_{k-D}}{\arg\min} \|y_k - s_{k-D}\|,$$

where $\| \; \|$ represents module value computation, a decision process is represented by obtaining a minimum module value result; $\hat{s}_{k-D}$ is an output decision result, is estimation of a desired signal $s_{k-D}$ in sending terminal pilot signals and is an input signal that will be used in an equalizer feedback portion;

the coefficient updating unit updates a current filtering coefficient $c_{k-1}$ to $c_k$ according to the equalizer input signal sequence $r_k$ and the processing result of the error code cross-correlation module $I_k$, and this is implemented as follows:

$$c_k = c_{k-1} - \mu \frac{P_{k-1} I_k}{(w + r_k^T P_{k-1} r_k)},$$

where $\mu$ is a step size adjustment constant; w is a forget constant factor; the filtering coefficient $c_k$ and the equalizer input signal sequence $r_k$ are column vectors; and $P_{k-1}$ is an autocorrelation inverse matrix not updated;

the autocorrelation inverse matrix estimation module contains a memory coefficient unit and an autocorrelation inverse matrix register and uses a currently received symbol sequence $r_k$ result to update autocorrelation inverse matrix estimation, and updating the autocorrelation inverse matrix estimation is as follows:

$$P_k = \frac{1}{w}\left[ P_{k-1} - \frac{P_{k-1} r_k r_k^T P_{k-1}}{w + r_k^T P_{k-1} r_k} \right],$$

where w is a forget constant factor; a receiving signal $r_k$ is a column vector; and $P_{k-1}$ is an autocorrelation inverse matrix not updated.

2. The adaptive RLS decision feedback equalizing system according to claim 1, characterized in that elements of the equalizer receiving signal $r_k$ are arranged in a time-descending order from a current time.

3. An implementation method for the adaptive RLS decision feedback equalizing system according to claim 1, comprising the following steps:

1) setting an initial value of $c_0$ for a filtering coefficient, where $c_0$ is any non-zero value; setting an initial value of $P_0$ for an autocorrelation inverse matrix, wherein it is assumed that $P_0 \sigma E$, where E is a unit matrix, $\sigma$ can be selected to be a constant; and setting values of control parameters D, $\beta$, $\mu$, w and $\varepsilon$;

2) using a currently not updated filtering coefficient $c_{k-1}$ to filter the input signal sequence $r_k$ to generate a filtering output signal $y_k$;

3) computing an error code cross-correlation result $I_k$ based on the filtering output signal $y_k$, a desired signal $s_{k-D}$ in a pilot sequence and the input signal sequence $r_k$;

4) updating the filtering coefficient $c_{k-1}$ to $c_k$ according to a step size u, a forget constant factor w, the error code cross-correlation result $I_k$, an equalizer input signal sequence $r_k$ and an autocorrelation inverse matrix estimation result $P_{k-1}$ not updated;

5) updating an autocorrelation inverse matrix estimation result $P_{k-1}$ to $P_k$ according to a forget constant factor w and an equalizer input signal sequence $r_k$;

6) repeating step 2) to step 5), until the equalizer coefficient converges, i.e. $\|c_{k+1} - c_k\| \leq \varepsilon$.

* * * * *